Jan. 23, 1962 G. L. GRANT ET AL 3,018,469
FARE COLLECTION AND SIGNAL SYSTEM FOR TOLL ROADS
Filed May 28, 1957 7 Sheets-Sheet 1
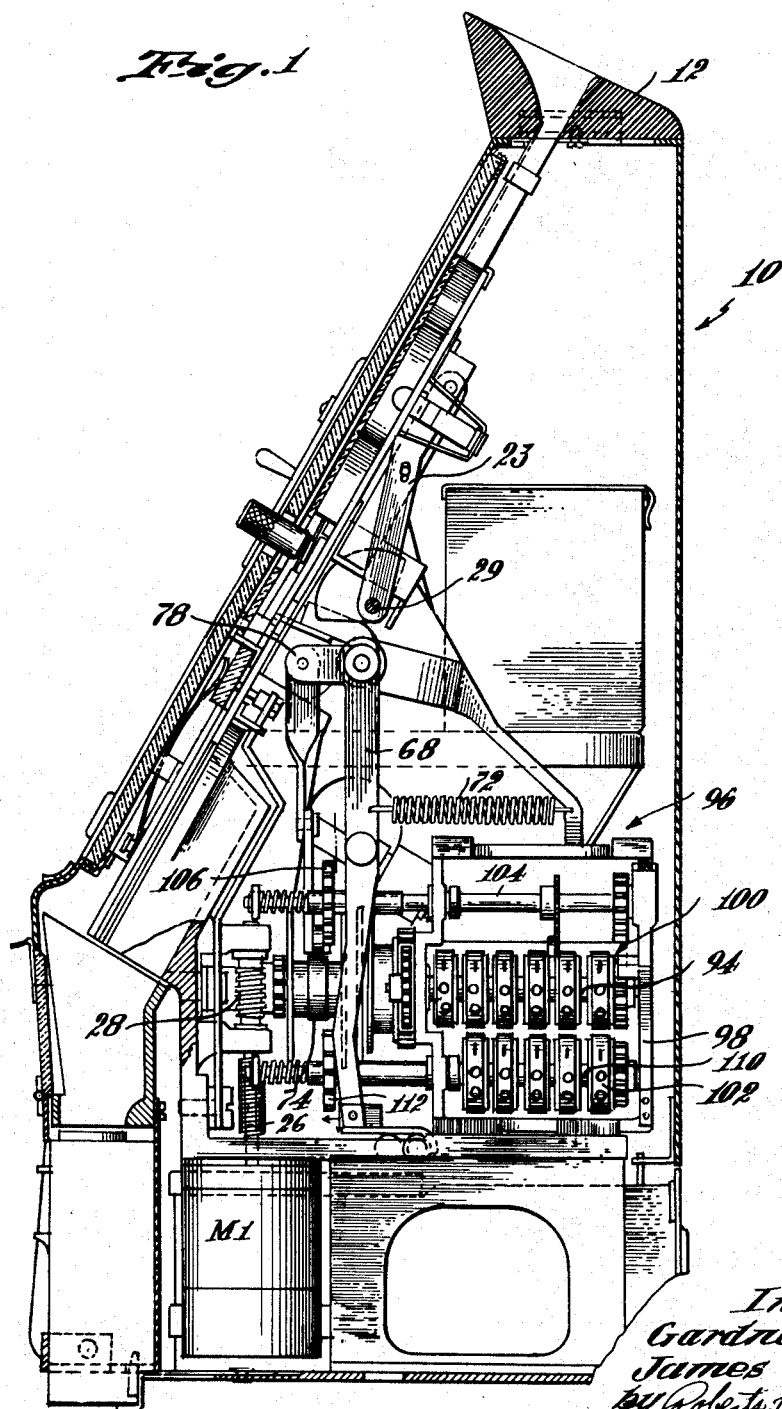
Inventors
Gardner L. Grant
James C. Hosken
by Roberts, Cushman & Grover
ATTORNEYS.

Jan. 23, 1962     G. L. GRANT ET AL     3,018,469
FARE COLLECTION AND SIGNAL SYSTEM FOR TOLL ROADS
Filed May 28, 1957     7 Sheets-Sheet 2
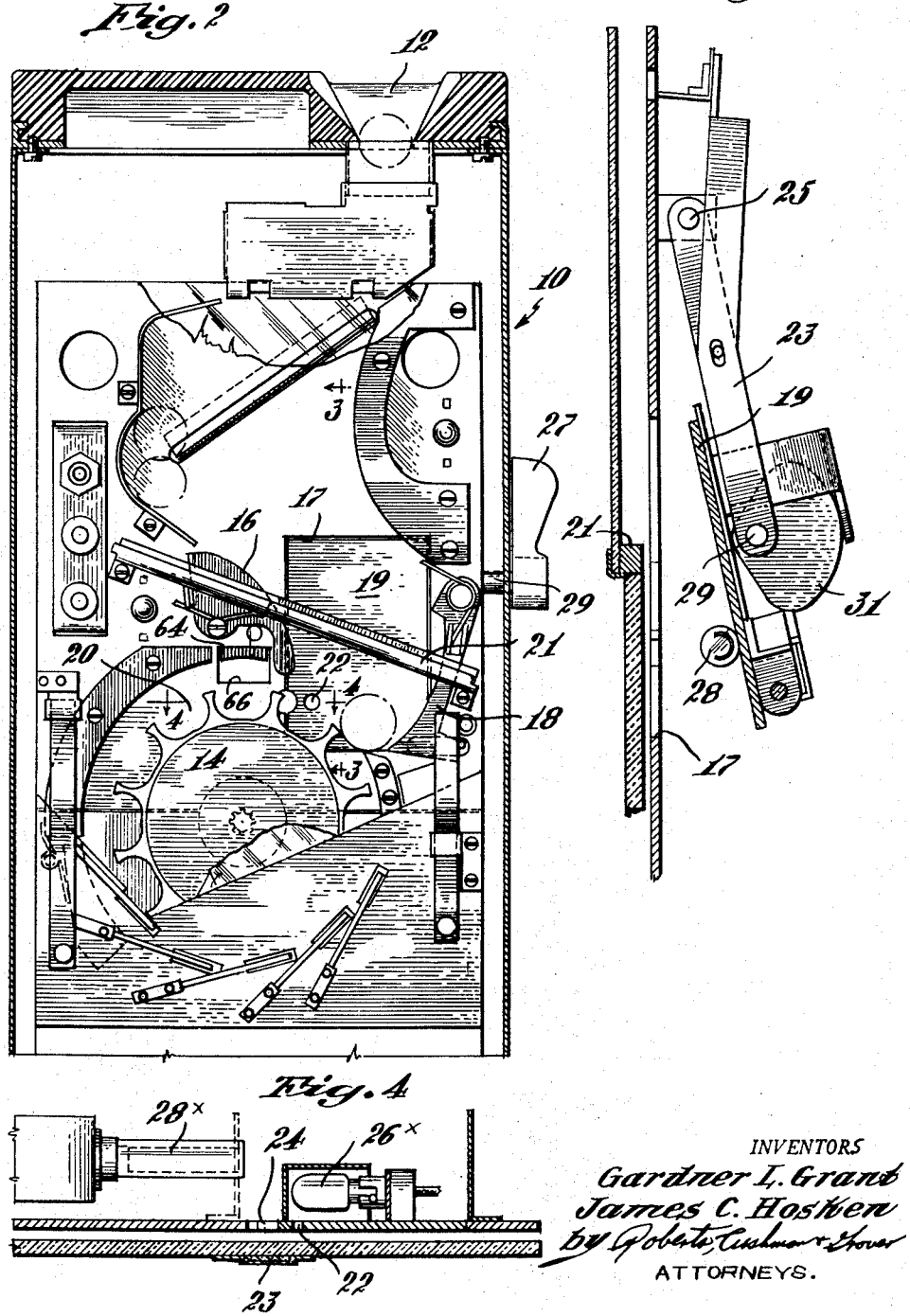
INVENTORS
Gardner L. Grant
James C. Hosken
by Roberts, Cushman & Grover
ATTORNEYS.

Jan. 23, 1962   G. L. GRANT ET AL   3,018,469
FARE COLLECTION AND SIGNAL SYSTEM FOR TOLL ROADS
Filed May 28, 1957   7 Sheets-Sheet 3
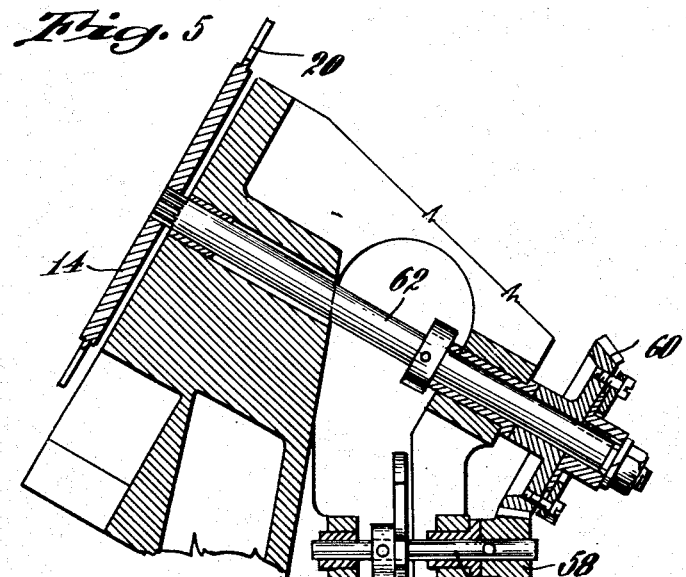
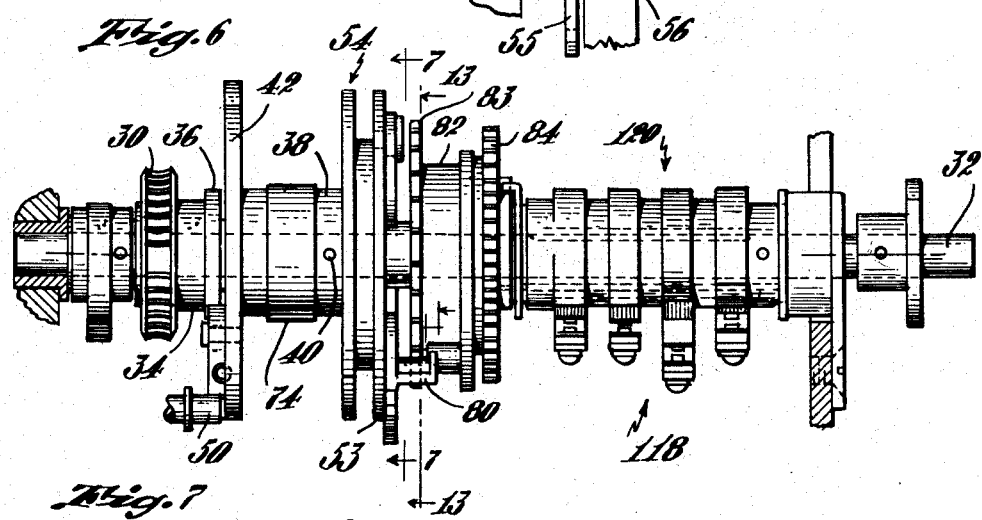
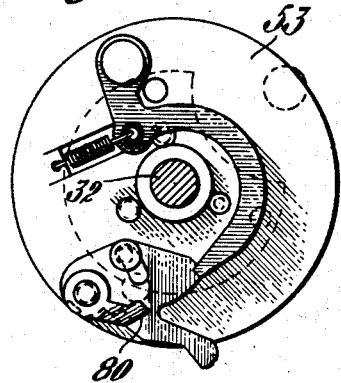
Inventors
Gardner L. Grant
James C. Hosken
by Roberts, Cushman & Grover
ATTORNEYS.

Jan. 23, 1962 G. L. GRANT ET AL 3,018,469
FARE COLLECTION AND SIGNAL SYSTEM FOR TOLL ROADS
Filed May 28, 1957 7 Sheets-Sheet 4
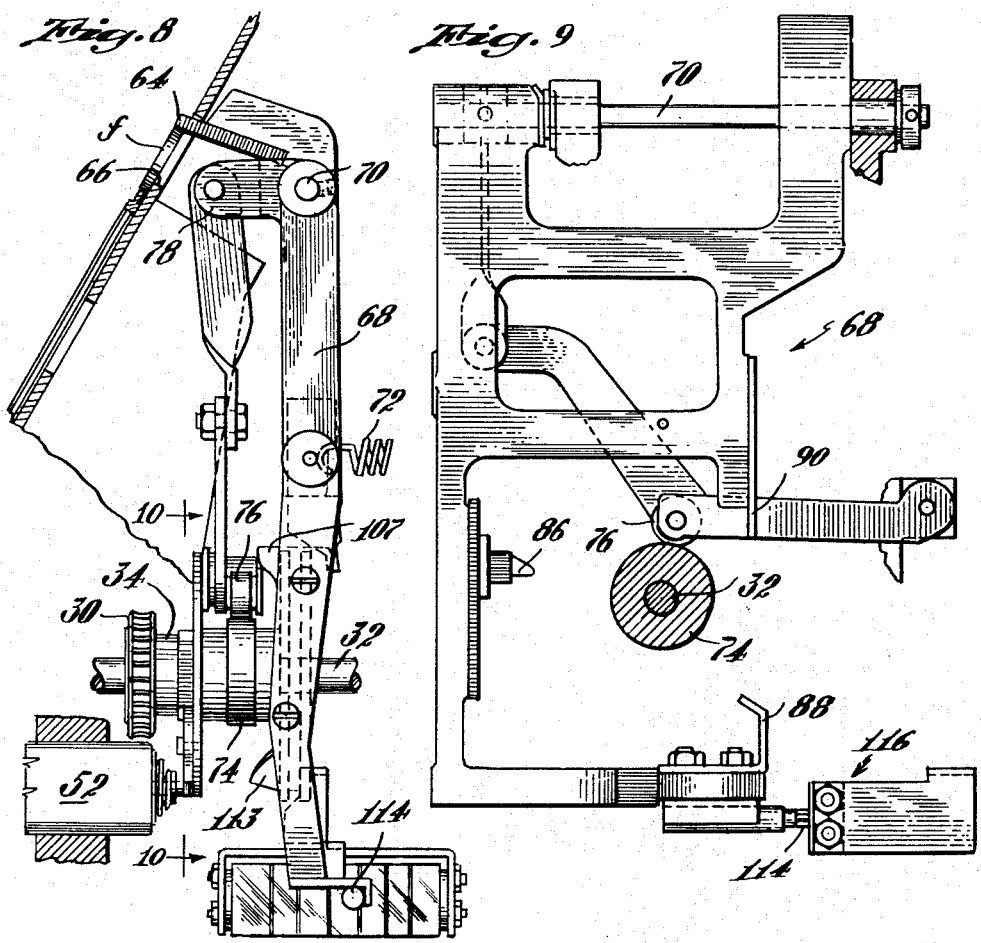
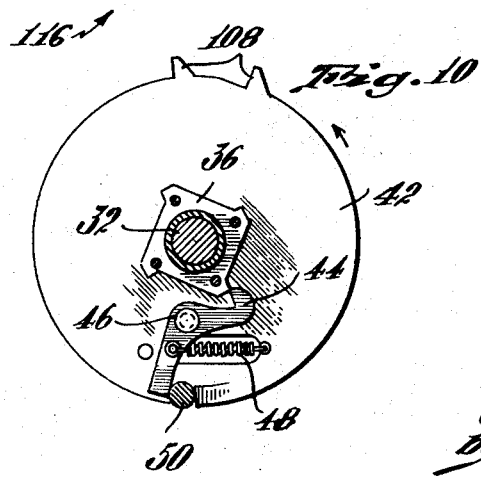
Inventors
Gardner L. Grant
James C. Hosken
by Roberts, Cushman & Grover
ATTORNEYS.

Jan. 23, 1962 G. L. GRANT ET AL 3,018,469
FARE COLLECTION AND SIGNAL SYSTEM FOR TOLL ROADS
Filed May 28, 1957 7 Sheets-Sheet 5
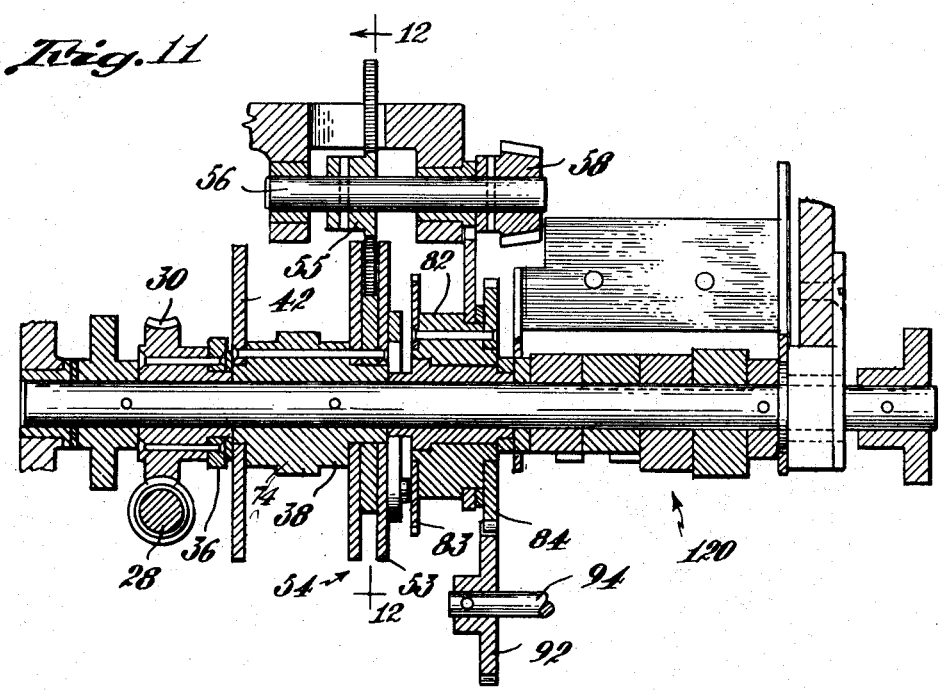
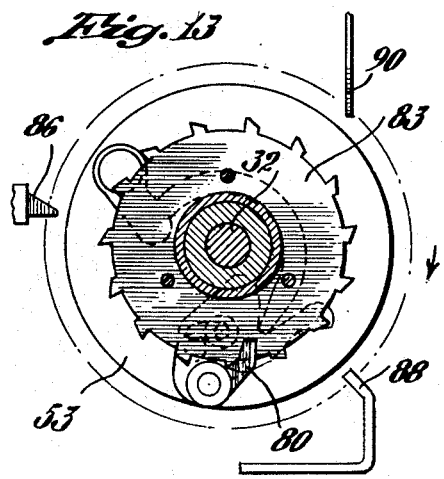
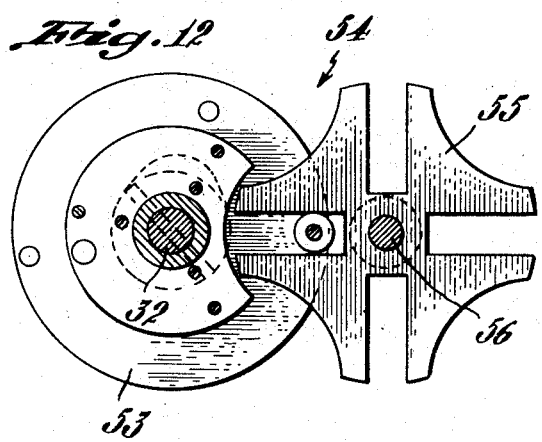
Inventors
Gardner L. Grant
James C. Hosken
by Roberts, Cushman & Grover
ATTORNEYS.

Jan. 23, 1962 G. L. GRANT ET AL 3,018,469
FARE COLLECTION AND SIGNAL SYSTEM FOR TOLL ROADS
Filed May 28, 1957 7 Sheets-Sheet 6
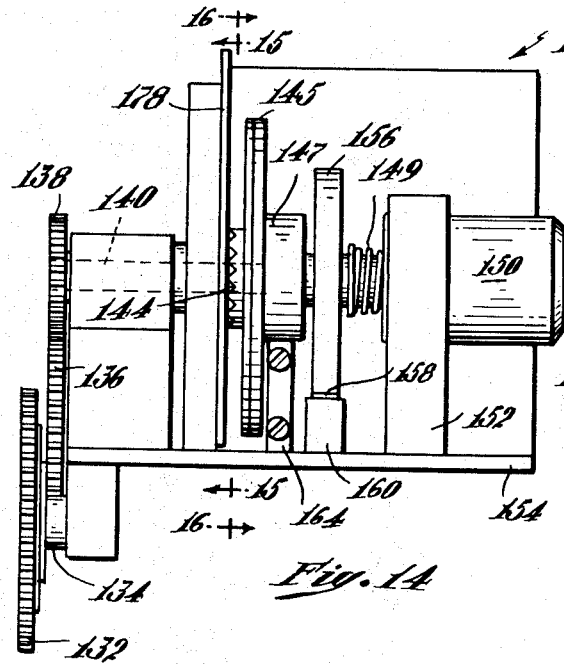
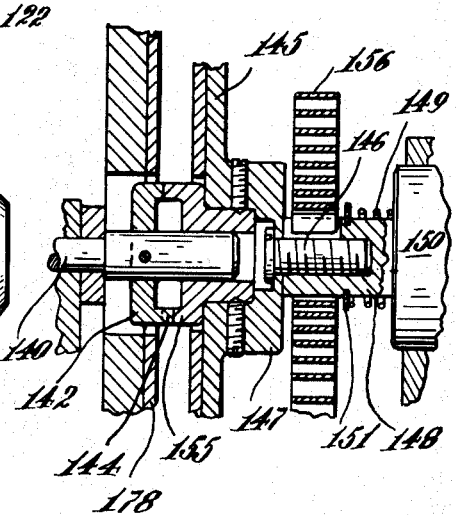
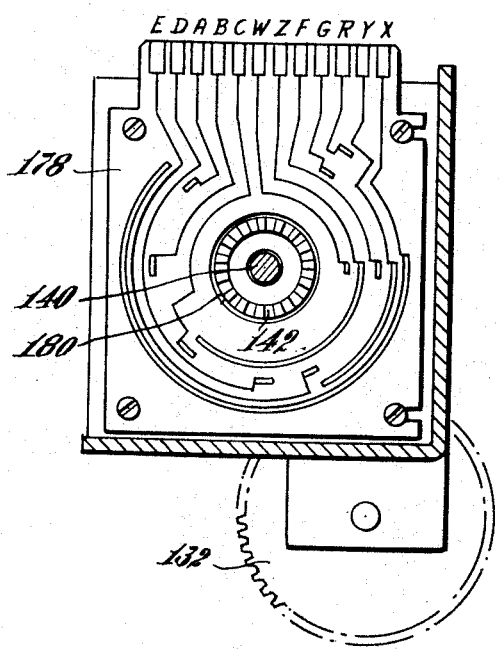
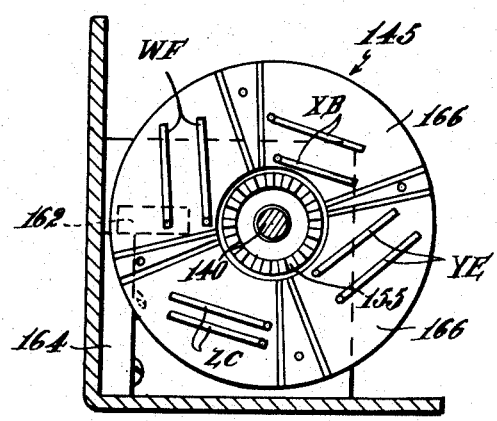
Inventors
Gardner L. Grant
James C. Hosken
by Roberts, Cushman & Grover
Attys Jan. 23, 1962     G. L. GRANT ET AL     3,018,469
FARE COLLECTION AND SIGNAL SYSTEM FOR TOLL ROADS
Filed May 28, 1957     7 Sheets-Sheet 7

Inventors
Gardner L. Grant
James C. Hosken

United States Patent Office 3,018,469
Patented Jan. 23, 1962

3,018,469
FARE COLLECTION AND SIGNAL SYSTEM FOR TOLL ROADS
Gardner L. Grant, Providence, R.I., and James C. Hosken, Jamaica Plain, Mass., assignors, by mesne assignments, to Universal Controls, Inc., New York, N.Y., a corporation of Maryland
Filed May 28, 1957, Ser. No. 662,099
17 Claims. (Cl. 340—31)

This invention relates to fare-collecting means and more especially to systems adapted to be used in multi-lane highways for the collection of toll fares with the least amount of delay, with the minimum number of attendants for keeping it in efficient operation, and with as little incentive as possible to cause attendants and/or motorists to cheat.

As herein illustrated the system contains means for receiving the toll fare in the form of coins, tokens, or combinations of coins and tokens, totalling the fare and comparing it with the required fare which is exhibited for observation by the motorist. In a system wherein all vehicles which traverse the highway pay the same fare, the memory device will be set up with reference to that particular fare and to that fare only. A system equipped with such a memory device is disclosed in the patent to Grant et al., No. 2,889,544, dated June 2, 1959 and which was granted upon our copending application for Letters Patent, Serial No. 637,019, filed January 29, 1957.

When, however, the required fare varies according to various classifications of vehicle, for example, vehicles having two axles, three axles, four axles, or the like, no prior memory device known to us is so devised that it may be shifted instantaneously and without interfering with the normal flow of traffic, so as to respond to different fares as, for example, to make the system respond properly to each of successive vehicles of different classifications approaching the toll station and in the interval between successive deposits of fares. A particular object of the present invention is to provide means, either manually actuatable or automatically responsive to variations in vehicle classification, to condition the memory device to respond to correspondingly different fares. The manually operable means for so conditioning the memory device may, for example, be a selector switch having a pointer or its equivalent, movable along a dial graduated to indicate different fares or different classifications of vehicle, while the automatic means may, for example, comprise a detector, for instance, a road treadle operating an axle counter of any known or desired type. Preferably setting of the memory is accompanied by operation of a visible indicator which exhibits the amount of the fare required. A favorable comparison, such as is produced when the deposited fare equals or exceeds that required, results in giving a fare-paid signal which, in turn, changes a suitable signal at the toll station, which normally exhibits a warning to the vehicle to stop, from "stop" to "go" and, at the same time, reconditions the system so as to be ready for the next deposit by restoring the parts to their zero positions. Should the fare deposited be less than that required, or if bent coins or slugs are deposited, the memory fails to respond to the deposited fare with the result that no fare-paid signal is given. The "stop" signal remains "on" and, under these conditions, departure of the vehicle from the toll station operates means for giving an alarm signal in the form of a flashing light and a gong, in addition to the normal "stop" signal, opens a scavenger door in the fare collection apparatus to clear it of the incomplete fare, bent coins or slugs and then resets the system to zero for the next deposit. Operation of the system is initiated by deposit of the fare and there is means responsive to a gap in the flow of coins, that is, between successive deposits, to add a cycle of operation to the apparatus. Optionally, a ticket printing means is included for issuing fare-paid receipts.

Still other objects and advantages of the system will appear hereinafter in connection with the following description and by reference to the accompanying drawings wherein:

FIG. 1 is a central, vertical section through an electrically operated fare-collecting and registering machine according to the present invention, the support upon which it rests being omitted;

FIG. 2 is a section, looking from the front, in a plane parallel to the front face of the coin-supporting plate;

FIG. 3 is a section substantially on the line 3—3 of FIG. 2, showing the discharge or scavenger opening for bad coins and the door closure therefor in open position;

FIG. 4 is a fragmentary section, to larger scale, substantially on the line 4—4 of FIG. 2, showing the relative position of the photocell and its exciter lamp, said cell and lamp constituting detector means whereby the motor is energized in response to the passage of a coin;

FIG. 5 is a fragmentary section in the vertical plane of the axis of the coin-receiving rotor, showing the rotor shaft and the gear train for driving it;

FIG. 6 is an elevation of a main shaft assembly;

FIG. 7 is a transverse section taken on the line 7—7 of FIG. 6;

FIG. 8 is an edge elevation of the coin-gauging element and associated parts;

FIG. 9 is a rear elevation of the gauging arm and its operating lever;

FIG. 10 is a section on the line 10—10 of FIG. 8;

FIG. 11 is a section in the axial plane of the shaft shown in FIG. 6, showing its relation to other elements of the mechanism;

FIG. 12 is a section on the line 12—12 of FIG. 11;

FIG. 13 is a section on the line 13—13 of FIG. 6, showing the relation of the toothed gear and its operating cam;

FIG. 14 is an elevation of the commutator portion of the memory device removed from the apparatus;

FIG. 15 is a vertical section taken on the line 15—15 of FIG. 14;

FIG. 16 is a vertical section taken on the line 16—16 of FIG. 14;

FIG. 17 is an enlarged vertical section of a fragmentary portion of the memory taken axially thereof.

Figure 18:
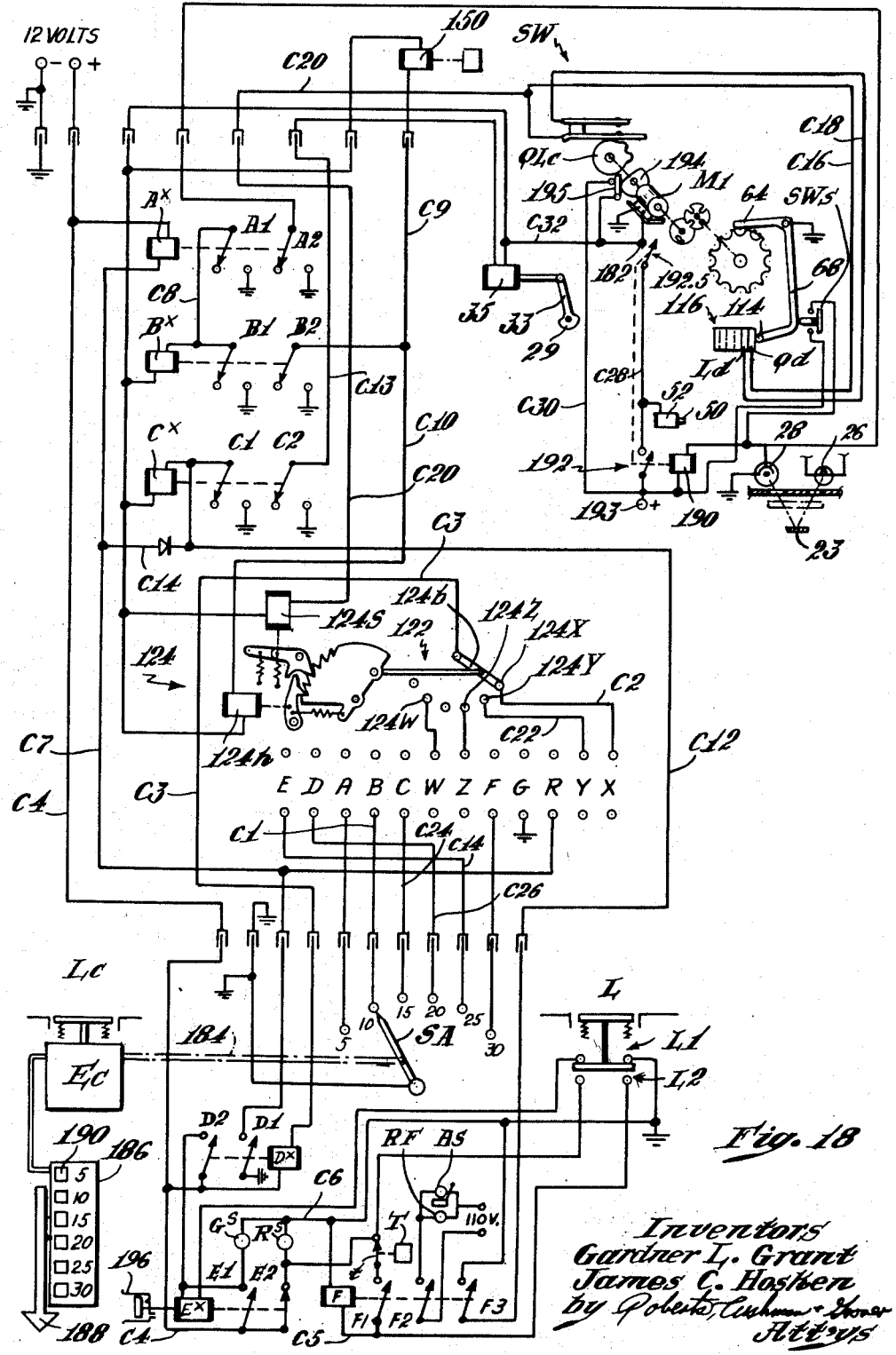
FIG. 18 is a wiring diagram showing the operation of the system as a whole.

For accomplishing the foregoing, a fare collection and registering apparatus (herein, at times, referred to as the "meter"), such as shown in copending application Serial No. 216,703, filed March 24, 1951, now Patent No. 2,848,158, dated April 19, 1958, is employed, modified in certain minor respects, as will appear hereinafter, for combination with a memory and a system of signals for traffic guidance. As disclosed in the aforesaid application, the apparatus has a housing 10, at the top of which is a hopper 12 into which coins making up the fare may be dropped. Below the hopper, internally of the housing (FIG. 2), there are means for conducting the coins downwardly over an inclined surface behind a transparent window to a feeding station where the coins, one at a time, enter one of a series of pockets 20 in a rotor 14. By means of suitable guides 16 and 18 the coins are made to enter the one of the pockets which is just to the right of the topmost pocket. Behind this pocket, in the inclined surface, there are two apertures 22 and 24 and behind the inclined surface (FIG. 4) are a light source 26x and a photoelectric cell 28x. In front of the inclined plate, between the apertures 22 and 24, there is fastened to the transparent window a mirror 23. The apertures, light source, photoelectric cell and mirror are so arranged that when no coin occupies the pocket, just to the right of the top, the light from the lamp 26 shines through the aperture 22, falls on the mirror and is redirected thereby, rearwardly through the aperture 24 onto the photoelectric cell. When a coin is dropped in the pocket 20, just to the right side of the top pocket, it intercepts the light and causes the photocell to energize a solenoid 190 which, in turn, closes a pair of switches 192 and 192.5 (FIG. 18), so as to supply current from a source 193 by way of a conductor C28 to a motor M¹.

The motor M¹ (FIG. 1) has a drive shaft 26 which rotates a worm shaft 28. The worm shaft engages a worm wheel 30 (FIGS 6 and 8), mounted to turn freely on a horizontal shaft 32, which shaft comprises the main drive shaft of the apparatus. The worm wheel 30 has a hub 34 to which there is fastened a ratchet wheel 36 (FIG. 10). Adjacent the ratchet wheel there is a sleeve 38, which is fixed to the shaft 32 by a pin 40. The left-hand end of the sleeve has fast to it a disk 42 which has on it a latch 44, pivoted at 46 and yieldably held by means of a coil spring 48, to engage with the ratchet wheel 36, so that as long as the latch 44 engages the ratchet wheel rotation of the worm wheel 30 will effect a corresponding rotation of the disk 42 and hence of the shaft 32. The latch may be held out of engagement with the ratchet wheel by a pin 50 which is movable into and out of the path of rotation of the latch. A spring holds the pin in the path of the latch and a solenoid 52 (FIG. 8), of which the pin is the core, is operable to withdraw the pin. The solenoid is connected in the above-mentioned motor circuit so as to be energized simultaneously with the energization of the motor to withdraw the pin 50 when a coin is deposited, thereby to permit the latch to clutch the disk 42 to the worm and hence produce rotation of the main shaft. Absence of a coin in the pocket at the end of the empty cycle will de-energize the solenoid and hence permit the pin to intercept the latch, thereby declutching the main shaft.

At the right-hand end of the sleeve 38 there is a Geneva mechanism 54 (FIGS. 6 and 12), having a part 55 which operates, through a countershaft 56 (FIGS. 5, 11 and 12), gears 58 and 60 and an inclined shaft 62 to turn the rotor 14, ½ of a revolution for each complete rotation of the main shaft. In other words, rotation of the main shaft 32 through one revolution or cycle, will turn the rotor 14 just far enough to advance the pocket, within which a coin is resting, one step from its position, just to the right of the top, to the top position beneath a gauge finger at a coin-gauging station.

At the coin-gauging station there is a gauge finger 64 (FIGS. 2 and 8), which extends through an aperture 66 in the inclined surface, located above and behind the topmost pocket of the rotor, so as to have contact with the upper edge of a coin f seated in the top pocket. The gauge finger 64 extends rearwardly and is fastened to the upper part of a downwardly extending arm 68 pivoted for swinging movement on a horizontal shaft 70, so that it swings forwardly, rearwardly and axially of the main shaft 32. A spring 72 urges the arm 68 rearwardly and, if no coin occupies the pocket, the arm will rest at its most rearward position against a stop. There is fixed to the main shaft 32 a cam 74 which turns with the main shaft and through a cam follower 76 and suitable linkage, connected to a finger 78 on the arm 68, will rock the arm forwardly, as the shaft commences to rotate, to cause the rotor to turn, so as to permit a coin in the pocket to pass beneath the gauge finger 64. The cam promptly releases the aforesaid linkage so that the gauge 64 comes to rest on the top of the coin (FIG. 8) and thus holds the arm 68 in a given angular position depending upon the diameter of the coin in the pocket. At this point, the Geneva wheel 55 dwells and the countershaft 56 stops so, that the rotor stops while the main shaft continues to rotate.

The right-hand member 53 of the Geneva mechanism, fast to the main shaft, continues to turn and has mounted on it a latch 80 (FIGS. 6 and 7) which travels circumferentially of the axis of the shaft 32 during its rotation To the right of the part 53 of the Geneva mechanism there is a sleeve 82 which is loose on the shaft and which has fast to its left end a ratchet wheel 83 (FIG. 13) and at its right end a gear 84. The teeth of the ratchet wheel 83 travels in a plane which coincides with the plane of travel of the latch 80. Normally, the latch 80 is held out of engagement with the teeth of the ratchet wheel by suitable means, but may be moved into a position to engage the teeth of the ratchet wheel, so as to clutch the ratchet wheel and cause it to rotate with the shaft 32. By releasing or operating the latch 80 at different points in the angular rotation of that part 53 of the Geneva mechanism fast to the shaft 32, it is apparent that the ratchet wheel 83 may be caused to turn different angular distances.

The latch 80 is operated to bring it into engagement with the ratchet wheel by the position of the gauge arm 68 which, in turn, is determined by the diameter of the coin lodged between the gauge finger and the pocket at the top of the rotor. This is effected by one of several trips 86, 88 and 90 carried by the arm, only one of which will engage the latch at any given time, and its engagement will be determined by the angular position of the arm. The ratchet wheel 83 has on it fifteen teeth and the trips are so located that for each deposit equalling a unit, that is, one penny, the ratchet wheel will be turned one step.

The gear 84 is, of course, correspondingly turned so that it rotates one division for each penny deposited, five divisions for each nickel, ten divisions for each dime and so forth. The gear 84 meshes with a gear 92 (FIG. 11) fast to the shaft 94 of a mechanical counter 96 (FIG. 1), such as shown in the pending application of Frank P. Rosapepe, Serial No. 610,814, filed September 19, 1956. This counter has its own supporting frame 98 (FIG. 1), which is fastened within the housing adjacent the main shaft and is adapted to total the fares deposited. This particular counter is designed to count pennies, nickels, dimes and quarters on one row of counter disks 100 and tokens on a second row 102 of counter disks. The first counter disk in the row 100 is fast to the shaft 94 so that it rotates one step for each step in the rotation of the shaft 94. In accordance with conventional construction, when the count of 9 is reached on the first disk this is transferred as a unit to the second disk. In like manner, when the second disk has made a complete revolution its count is transferred as a unit to the third disk and so forth. Contra to the usual counter, however, quarters are counted in on this row through a countershaft 104 which operates through a train of gears to add in two steps to the second disk of the row 100, whenever a quarter is deposited in the machine. Without going into the details of the mechanism, which is shown in the aforesaid patent, No. 2,848,158, this is effected by a sliding gear 106 which is moved by a lug 107 (FIG. 8) on the gauge arm 68, when a quarter is deposited, to bring it into engagement with the disk 42. The disk 42 has on it two teeth 108 (FIG. 10), by means of which the gear 106 is rotated two steps. The remaining five cents of the quarter is added to the first counter disk through one of the trips on the arm which effects rotation of the ratchet wheel through five steps. The counter disks of row 102, which count tokens, are mounted on a shaft 110 and this too has on it a sliding gear 112 (FIG. 1), which is moved by a lug 113 (FIG. 8) on the arm 68, to a position to have contact with a single tooth disk on the main shaft, not shown herein, so that for each rotation of the main shaft, the shaft 110 will be turned one step, thereby to add up the number of tokens deposited.

At the lower end of the arm 68 (FIGS. 1, 8 and 9) there is a brush 114 which is swingable with the arm relative to a bank of commutator blocks 116, these blocks being insulated one from the other. Each of the blocks forms a part of an electric circuit. The several circuits have switches 118 (FIG. 6), which are normally open, but are adapted to be closed by cams 120 fast to the main shaft 32. During each rotation of the shaft 32 each of the switches 120 is closed, however, the only circuit which will be energized will be that which includes the corresponding commutator block engaged by the brush 114. Since the position of the brush 114 is determined by the denomination of the coin deposited, the circuit energized will represent the denomination of a coin. The circuit may be employed for various purposes such, for example, as ringing a distinctive bell one or more times, as disclosed in the patent to Max L. Grant, No. 2,805,746, dated September 10, 1957. As herein disclosed, only two commutator blocks are employed (FIG. 18), a block marked Q$d$ and another marked L$d$ with which the brush makes contact when a quarter or token is deposited. Moreover, instead of having a switch and operating cam for each, a single switch SW and single cam QL$c$ is provided for connecting the two switches into a memory circuit, which will be described hereinafter, to provide for registering fares which include quarters and tokens, as distinguished from coins of lower denomination. This means includes a commutator 122, a stepping switch 124, relays A$x$, B$x$, C$x$, D$x$ and E$x$ and a fare selector arm SA (FIG. 18).

Before describing the construction and operation of the commutator 122, it is to be observed that the fare collection apparatus has provision for intercepting and disposing of bent coins and/or slugs. Referring particularly to FIGS. 2 and 3, the inclined surface against which the coins slide downwardly toward the rotor 14, has in it an opening 17 within which there is disposed a scavenger door 19. Extending downwardly from left to right across the door 19 and just above the rotor 14 is a separator 21 which is spaced from and parallel to the door 19 by an amount which corresponds to the thickness of the thickest coin to be registered. Good coins will slide through the space between the separator 21 and the door 19 and continue on downwardly to a pocket in the rotor 14. Bad coins such as bent coins and/or slugs which are too thick, will be hung up on the separator and will lie against the scavenger door 19. The door 19 is suspended on the arm 23, pivoted for swinging movement on a spindle 25, so that it may be swung rearwardly to allow bad coins to be dropped out into suitable means at the bottom of the housing. In the aforesaid machine, rearward movement of the door is effected manually by a handle 27 fixed to a shaft 29. The shaft 29 has fast on it a cam 31 which, when turned in one direction, will swing the closure or door rearwardly to an open position and, when turned in the other direction, will swing the door closure forwardly to a closed position. For the purposes of the present invention, the shaft 29 may have fastened to it an arm 33 (FIG. 18) located inside of the housing in place of, or in addition to, the manually operable arm 27. The distal end of the arm is connected to a solenoid 35 which is operated, as will appear hereinafter, to swing the scavenger door open and closed when desired.

The commutator 122 (FIG. 14) is mounted in the housing adjacent the main drive shaft 32 and has a drive shaft 140 (FIG. 17), which is connected to the gear 84 (FIG. 11) on the main drive shaft 32 by a train of gears 132, 134, 136 and 138 (FIG. 14), the ratios of which are such that the gear 138 which is fast to the shaft 140 of the commutator, is turned through an angular distance of 9° or 1/40 of a revolution for each penny deposited in the meter and correspondingly 45° when a five cent piece is deposited, and 90° when a dime is deposited. The right-hand end portion of the shaft 140 has mounted on and fixed to it a clutch member 142 (FIG. 17) which has, on its right-hand face, clutch teeth 144. A commutator disk 145 (FIGS. 15 and 17), having a hub 147 at its center, is supported for rotation about the axis of the shaft 140, by means of a pin 146 extending from the hub 147, axially into a core rod 148 extending horizontally from a solenoid 150, which is supported on a post 152 (FIG. 14) fastened to the base 154 in axial alignment with the shaft 140. A clutch member 155 is fixed in the hub 147 so as to extend through a central hole in the disk 145 and has teeth for mating engagement with the teeth on the clutch member 142. Normally, the clutch members are held engaged, when the solenoid is unenergized, by a coil spring 149 mounted on the core rod with its ends bearing respectively, on the solenoid housing and a shoulder 151 on the core rod. The core rod 148 is reciprocal in its coil and may be drawn toward the right by energization of the solenoid to disengage the clutch member, so that rotation of the shaft 140 will not produce a corresponding rotation of the disk 145 and so that the commutator disk 145 may be returned to its zero position, as will appear hereinafter.

A clock spring 156 (FIG. 17) is mounted on the core rod 148 with its inner end fastened to the hub 147 and its outer end fastened by a screw 158 to a block 160 (FIG. 14) on the base. The spring is put under tension so as normally to urge the commutator disk to turn in a counterclockwise direction when viewed from the left-hand end of FIG. 14. The hub 147 has on it a positioning block 162 (FIG. 16) and the base has on it, in turn, a positioning block 164 and these positioning blocks are normally held engaged by the tension of the clock spring at a zero position (FIG. 16), to which position the disk will return from a displaced position as soon as the clutch disks are disengaged.

The commutator disk 145 (FIG. 16) is comprised of a non-conducting material and has on its left-hand face four circumferentially spaced segments 166 formed, for example, by the so-called printing process in which a conductive material is applied to the surface and then etched to remove the material from certain parts and hence to insulate them from each other. Each segment has fastened to it a pair of contacts or brushes in the form of flat elastic springs X—B, Y—E, Z—C and W—F, which are fastened at one end to a segment and stand outwardly therefrom at their other ends.

The commutator plate 178 (FIG. 15) is fastened to the base in an upright position perpendicular thereto and to the axis of the shaft 140 with its surface parallel to the commutator disk. The commutator plate has through it an opening 180 through which the shaft 140 passes and which is large enough to accommodate the clutch member 142. On the face of the commutator plate there are several concentrically arranged conductors or slip rings which may be bridged by the brushes so as to form a current path from one to the other through the pairs of brushes, as will subsequently be related. As shown, the printed slip rings are twelve in number, distributed about the plate, and each has connected to it a terminal, the latter being distributed along the upper edge of the plate in spaced relation and are identified, as herein shown, from left to right, E, D, A, B, C, W, Z, F, G, R, Y and X.

The commutator, as just described, and parts of the fare collection apparatus are illustrated diagrammatically in FIG. 18, in association with the stepping switch 124, relays A$x$, B$x$, C$x$, D$x$ and E$x$, a selector arm SA and road switches L, L$^2$, of which there are two, one which precedes the meter and one which is beyond the meter in the direction of traffic flow.

Referring to FIG. 18, there is shown a motor socket 193 which, as previously explained, supplies current to the motor through switches 192 and 192.5 when the solenoid 190 is energized by interception of the light beam when a coin drops into that pocket of the rotor, which is to the right of the topmost pocket, and so closes the switches 192 and 192.5. This starts the motor M¹, whereupon the rotor moves the coin out of the path of the light beam so that the solenoid 190 becomes de-energized and opens the switches 192 and 192.5. There is a cam 194 on the motor shaft, however, which commences to turn as soon as the shaft starts and this closes a normally open switch 195 which connects the motor to the socket 193 by way of a conductor $c30$ and conductor $c32$, so that the motor continues to operate until the end of the cycle even though the switches 192 and 192.5 are open. At the end of a normal cycle there will be a coin beneath the arm 64 and the switch 195 would normally open the motor circuit except for a skip switch SW$s$ which operates to initiate an empty cycle of operation even though there is no coin in position to intercept the light beam. The skip switch SW$s$, is closed at the end of the cycle, when there is a coin beneath the gauge arm; consequently, at the end of the cycle, the solenoid 190 is again energized so as to close the switches 192 and 192.5 and hence to complete a circuit to the motor. Initial movement of the main shaft will lift the gauge and allow the coin beneath it to move beyond, whereupon, the gauge arm will swing rearwardly, by reason of its spring, to a position in which the trip carried thereby will not actuate the latch on the ratchet wheel and hence no rotation will be imparted to the counter or to the commutator disk 145 which is geared thereto. At the end of the empy cycle there will be no coin beneath the gauge arm and the latter will have moved rearwardly and opened the skip switch so that it cannot initiate a second empty cycle.

For the purpose of illustrating how the system responds to several different fares, suppose that a ten cent fare is required, the attendant, either because he recognizes the approaching vehicle as one for which that fare should be paid, or because all of the vehicles flowing through that station at that particular time are to be charged a ten cent fare, manually swings the selector arm SA (FIG. 18) on the control panel at the toll booth to a position opposite the terminal marked "ten cents." By placing the selector arm opposite the terminal marked "ten cents" it is connected by a conductor $c1$ to the slip ring B on the commutator plate 178. Now, if the motorist deposits ten cents in the fare registering apparatus, the mechanical counter in the apparatus will step the commutator disk 145 around ten steps which will bring the pair of brushes X—B (FIG. 16) thereon to a position where slip ring X (FIG. 15) will be connected to slip ring B. Slip ring X is connected by a conductor $c2$ (FIG. 18) to a terminal 124$x$ on the stepping switch 124 which is at its normal or home position. The terminal 124$x$, through arm 124$b$, is connected by a conductor $c3$ to a relay D$x$ which, in turn, is connected to a 12 volt source of current by a conductor $c4$. The relay D$x$ operates by way of relays E$x$ and F to control "stop" and "go" signal lights and also alarm signals as follows:

The relay D$x$ closes momentarily a switch D2 which, in turn, operates the relay E$x$. Relay E$x$ promptly closes switches E1 and opens switch E2. The switch E2, which is normally closed, connects one side of a signal device R$^s$ to a positive line C4 and its other side to a ground line C6, so that the signal R$^s$, which is a "stop" warning in the form of a red light, is normally burning. Operation of the relay E$x$ therefore, by opening the switch E2, extinguishes the stop signal R$^s$. The switch E1 is normally open and connects one side of a signal device G$^s$ to the positive line C4 and its other side to the ground line C6, which signal is normally extinguished. One side of the switch E1 is also connected to one side of the relay E$x$. Accordingly, when the switch E1 is momentarily closed it not only completes the circuit through the signal G$^s$ but also acts as a holding switch to hold the relay E$x$ energized so that the signal G$^s$ which is a green light, will continue to burn until the circuit is interrupted, as will appear hereinafter.

When the signal G$^s$, that is, the green light is turned "on," the motorist knows that he has paid the correct fare and may continue on. At the far side of the station, in the direction of travel, there is a treadle operated switch L which is provided with two sets of contacts L1 and L2. As the motorist passes over the road treadle switch the switch L is opened, thereby breaking the circuit through the relay E$x$, opening the switch E1 and extinguishing the green light. At the same time, the switch E2 is closed so as to turn on the red light.

As previously explained, the switch D1 is also closed at the time the switch D2 is closed, to ground a reset relay A$x$, through a conductor $c7$. The relay A$x$ shifts switches A1 and A2 from the left-hand position shown, to the right-hand position. Switch A2 connects the motor circuit to a twelve volt source to continue operaiton of the motor through a second cycle in the absence of a coin in the rotor and also to clear the coin from beneath the gauge, so that the gauge arm may swing to an inoperative position during the empty cycle. The switch A¹ grounds relay B$x$ through conductor $c8$. Grounding of relay B$x$ shifts switches B¹ and B2 from left to right. Switch B¹ operates to hold the relay B$x$ until the end of the cycle. Switch B2 grounds the commutator solenoid 150, by way of a conductor $c9$, to declutch the commutator disk 145 (FIGS. 16 and 17) from the shaft 140 and hence to permit it to return to its zero position. At the same time, the homing switch solenoid 124$h$ is grounded through conductor $c10$, so that it returns to its zero position provided it has moved away from its home position. In the example given however it is not moved away from its home position and hence nothing happens. The cycle of operation is now completed, assuming that the correct ten cent fare was deposited. If, however, the wrong fare, slugs or bent coins, or no fare at all was paid, the commutator disk will not turn through the proper distance and hence no signal will come through the commutator and stepping switch to operate the relay D; consequently, the switch D¹ will not be operated and the red signal light R will continue to burn. If, however, the motorist goes through the red signal light and crosses the road switch L, he not only opens switch L¹ but also closes switch L2. Closing switch L2 operates the relay F which is connected at one side through the switch L2 to the line C5 and, at its other side, to the line C6. The relay F, in turn, closes switches F¹, F2 and F3. Switch F¹ is connected at one side to the relay F and at its other side through a normally closed switch $t$ to the line C6. The switch F¹ acts as a holding switch to hold the relay F until the circuit is broken by a timer T, which opens the switch $t$ after a predetermined interval. The switch F2 is connected at one side to a 110 volt line and at its other side to a parallel circuit containing alarm signals RF and AS so that, in addition to the "stop" light R, a violation, by passing through the red light, is accompanied by operating alarm signals which are respectively, a flashing red light RF and a gong AS. These continue until the timer breaks the circuit.

Since the red light may have been caused by deposit of bent coins, slugs or insufficient coins, as well as by no payment at all, it is desirable to clear the apparatus following departure of the motorist. Accordingly, the switch F3 is connected by way of a conductor $c12$ to means for operating the scavenger solenoid 35 so as to swing the scavenger door open, thereby to clear the fare collection and registering apparatus. This is accomplished through a relay C$x$ by way of conductor $c12$. The relay C$x$ shifts switches C$^{1x}$ and C$^{2x}$ from left to right. Switch C$^{1x}$ holds the relay C$x$ until the cycle is completed. Switch C$^{2x}$ is connected by way of a conductor $c13$ to the scavenger solenoid 35 so as to swing the scavenger door open, thereby to clear the fare collection and registering apparatus. At the same time, the relay Ax is energized through conductor c14 which has a rectifier in it to return the commutator and stepping switch to zero positions if they have been displaced.

By swinging the selector arm SA to the appropriate position the foregoing sequence of events takes place by deposit of coins of denominations of five, ten, fifteen and twenty cents. If a quarter is the fare to be exacted the selector arm SA is placed opposite the terminal marked twenty-five cents on the panel. This connects the selector arm through a conductor c14 to the slip ring E on the commutator plate 178. When the quarter is deposited in the fare collection apparatus, as previously explained, the mechanical counter will cause the commutator disk 145 to rotate through five steps and stop. This is twenty steps short of the slip ring E. The fare collection apparatus, as previously explained, operates through the gauge arm 68 to swing the lower end of the brush 114 into engagement with one or another of the commutator blocks 116 in the fare collection apparatus. When the brush 114 is in contact with the block Qd (FIG. 18) a circuit is established through conductor c16 to send a single impulse through the conductor c20 to the actuating solenoid 124S of the stepping switch, so as to move the stepping switch arm 124b from the terminal 124x to the terminal 124Y, which is twenty points in advance of the terminal 124x. This connects the stepping switch arm 124b through a conductor c22 to the terminal Y which, in turn, is connected to a pair of brushes Y—E (FIG. 16) twenty steps in advance of the first set of brushes X—B. Since the brushes have already been advanced five steps by the mechanical counter the total advancement is the sum of twenty plus five which is twenty-five steps corresponding to twenty-five cents and at this point, the brushes Y—E will connect the slip rings Y and D (FIG. 16). Thus current will pass through the commutator and stepping switch to the conductor c3 and from thence to the relay Dx. Closing of the relay Dx moves switches D1 and D2 in the same manner as previously pointed out, with the result that the red signal light is extinguished, the green signal light turned on, the commutator returned to its zero position and the stepping switch returned to its zero position. If an incorrect fare was deposited, as was also previously explained, the red signal light will remain "on," the alarm signal will be given, the scavenger door will be opened and the system will be returned to its zero position.

If the system is to be set up for receiving tokens, the selector arm SA is swung either to the terminal marked 15 or the terminal marked 30, provided that tokens of a value of fifteen cents are employed. As has been previously pointed out, tokens do not affect a rotation of the commutator; however, they shift the gauge arm 68 into contact with the commutator block Ld of the fare registering apparatus. This establishes a circuit through conductor c18 (FIG. 18) to switch SW. Switch SW is closed twice by rotation of the double lobe cam QLc for a single rotation of the main shaft to send two impulses through the conductor c20, to the stepping solenoid 124S, which thus moves the stepping switch arm 124b from terminal 124x to terminal 124Z. This connects the Z—C brushes (FIG. 16) in the commutator by way of conductor c24 through the selector arm, thereby completing the circuit through the conductor c3 to the relay Dx. If two tokens are deposited four impulses are sent through the conductor c20 so as to advance the stepping switch arm 124b to the contact 124W, thereby selecting brushes WF (FIG. 16) which complete a circuit through a conductor c26 to the selector arm. Establishment of a circuit through the conductor c3 by means of the tokens as explained, results in operation of the signals and returning the system to zero as before.

It is to be observed that the circuit is designed so that, if the correct fare is paid and the motorist departs, passage of the vehicle over the road switch L changes the signal lights from green to red but also momentarily energizes the relay F. This would result in operation of the alarm signals which is undesirable. Accordingly, a delay element in the form of a dash pot 196 is connected to the operating arm of the relay E so that, when the relay E is de-energized, following depression of the road switch L, switches E1 and E2 are caused to lag in their movement for a period of, for example, 2 to 3 seconds, which is time enough to permit the vehicle to pass over the road switch L and for the road switch to return to its normal position before the switch E2 is closed. This will eliminate the aforesaid momentary energization of the relay F and consequently prevent the alarm signals from being operated.

As thus far explained, the selector arm SA was manually moved by an attendant at a toll station so as to place it opposite the proper terminal depending upon the vehicle approaching the station, or if all the vehicles travelling through the toll station were to pay the same fare it was set opposite that terminal and left in that position. Sometimes it is desirable to operate the system without having an attendant present and to have means for shifting the selector arm automatically to take care of different fares exacted for vehicles of different kinds. Accordingly, as shown in FIG. 18, a road switch Lc is mounted in the road ahead of the station so as to actuate a detector Ec, the latter being adapted to respond to the kind of vehicle passing over the road switch to shift the selector arm SA through a linkage 184 to the proper position. The detector may be electrical, magnetic, acoustical or the like, for example, it may be a conventional axle counter, or electrical means which responds differently to the passing of objects of different lengths such, for example, as the apparatus disclosed in the patent to Geffchen et al., No. 2,048,740, dated July 28, 1936.

It is also desirable to display the fare to be deposited and to indicate the place of deposit. Accordingly, there may be mounted above the fare collection apparatus a fare indicator 186 and a deposit indicator 188, the former lighting up one of the windows of a column of windows 190 adjacent a column of fares, and the latter constituting an arrow pointing in the direction of the hopper at the top of the fare collection apparatus. Optionally, neon numerals may be substituted for the painted numerals and adjacent lighted windows.

Suitable holding circuits are included in the detector to hold the arm SA in operative position and the fare indicator illuminated until the cycle of operation is completed.

It should be understood that the present disclosure is for the purpose of illustration only and that this invention includes all modifications and equivalents which fall within the scope of the appended claims.

We claim:

1. In a toll collecting system of the kind wherein vehicles of different classifications, travelling along the highway, pass a toll collecting station at which they are required to pay a prescribed fare which may vary according to their classification, and including adjustable mechanism operative, in response to deposit of a fare equalling or exceeding the prescribed fare to give the vehicle clearance to proceed, or in response to failure to deposit a fare equalling or exceeding the prescribed fare to forbid the vehicle to proceed, in combination, means operable instantaneously and without interfering with the normal flow of traffic to adjust said mechanism to respond to different fares according to the classification of the vehicle.

2. Apparatus according to claim 1, comprising means for adjusting the mechanism which is manually operable by an attendant.

3. Apparatus according to claim 1, comprising means for adjusting the mechanism which is a manually operable arm movable along a series of graduations corresponding respectively to the several fares which may be set up on the mechanism by adjustment thereof.

4. Apparatus according to claim 1, comprising means for adjusting the mechanism which comprises a vehicle-actuated detector which responds differently to approching vehicles of different classification.

5. Apparatus according to claim 1, comprising means operative to exhibit to the view of the vehicle driver the amount of fare set up by adjustment of said mechanism, and means operable concomitantly with the adjustment of the mechanism to change the exhibiting means correspondingly.

6. In a toll collecting system of the kind wherein vehicles of different classification, travelling along the highway, pass a toll collection station at which they are required to pay a fare which may vary according to the classification of the vehicle, in combination, a fare receptacle, an adjustable memory device including means which will produce an impulse when the memory device is matched by the deposit of an amount corresponding to the amount to which the memory device is adjusted, means operable instantaneously and without interfering with the normal flow of traffic and in the interval between successive deposits, to adjust the memory to any one of several different fares according to the classification of the vehicle, and "stop" and "go" signal means normally exhibiting a "stop" warning operable, in response to the impulse produced by the memory device, to change the signal from "stop" to "go."

7. A toll collecting system according to claim 6, comprising other means located beyond said signal means in the direction of vehicle travel, actuatable by the vehicle in proceeding along the traffic lane, and operable, in the absence of said impulse, to maintain the "stop" signal and return the system to its initial condition.

8. Apparatus according to claim 6, comprising means located beyond said signal means in the direction of vehicle travel, actuatable by the vehicle in proceeding along said traffic lane, said means being operable in the absence of said impulse to maintain the "stop" signal, and other means, responsive to the impulse but at a predetermined interval thereafter, to render operation of said last-named means ineffective.

9. Apparatus according to claim 6 comprising a spurious coin separator, a scavenger door operable to release spurious coins to clear the apparatus, and means operable by departure of the vehicle from to toll station without having deposited a fare, such as to change the signal from "stop" to "go" to effect operation of the scavenger door.

10. In a toll collecting system of the kind wherein vehicles of different classification, travelling along the highway, pass a toll collecting station and at which they are required to pay a fare which may vary according to their classification, means operative to cause the apparatus to start and complete one cycle of operation for each coin deposited, means adjustable according to the classification of a vehicle to respond to that number of cycles which results in the deposit of coins constituting the fare set up in said means to produce an impulse, a circuit containing signal means normally exhibiting a "stop" warning, said circuit being responsive to said impulse, upon the payment of the correct fare, to change the signal from "stop" to "go," means also responsive to said impulse to add one cycle to the number of coin-operated cycles, and means operable during the added cycle to restore the system to its initial condition.

11. In a toll collecting system of the kind wherein vehicles of different classification, travelling along the highway, are required to pay a prescribed fare in passing a toll station at which a "stop" signal is normally exhibited, and wherein, at said station, there is apparatus for receiving and registering coins including a movable coin support containing coin-receiving pockets, said apparatus being responsive to the deposit and registration of the correct fare, whether in the form of a single coin or a plurality of coins which, in the aggregate, constitute the correct fare, to change the signal from "stop" to "go," the apparatus comprising motor-driven means normally operable to move the coin support the distance of one pocket for each coin deposited, and means for effecting operation of said motor-driven means whenever the signal is changed from "stop" to "go," to move the support the distance of one additional pocket to segregate the deposited fare from the succeeding deposited fare.

12. Apparatus according to claim 11, comprising means operative, at the end of said additional movement of the coint support, to change the signal from "go" to "stop."

13. Apparatus according to claim 11, wherein said coin support holds each deposited fare stationary and in full view of the depositor with the individual coins spaced apart in successive pockets in a row so that they do not overlap.

14. In a toll collecting system of the kind wherein vehicles of different classification, travelling along the highway, are required to pay a prescribed fare in passing a toll station, in which the "stop" signal is normally exhibited, and wherein, at said station, there is apparatus for receiving and registering coins including a rotary coin-transfer device containing coin-holding pockets, said apparatus being responsive to the deposit and registration of the correct fare, whether in the form of a single coin or a plurality of coins which, in the aggregate, constitute the correct fare to change the signal from "stop" to "go," the apparatus comprising a motor-driven shaft which makes a single revolution and stops in response to the deposit of each individual coin, said shaft operating during each single revolution to turn the transfer device a distance of one pocket, and means operative, substantially concomitantly with the change of the signal from "stop" to "go" of a given deposit, to rotate the transfer device the added distance of one of more pockets automatically to segregate the deposited fare whether it consists of one or more coins from the succeeding deposited fare.

15. Apparatus according to claim 14, comprising means operative, at the end of the added movement of the coin-transfer device, to change the signal from "go" to "stop."

16. Apparatus according to claim 14, wherein said coin-transfer device temporarily holds successive deposited fares separated, one from another, by an empty pocket and in full view of the depositor, with the individual coins, of each deposit, spaced apart by successive pockets in a row so that they do not overlap.

17. Apparatus according to claim 14, comprising means operative, substantially at the end of the rotation of the transfer device the added distance, to separate successive deposits, to change the signal from "go" to "stop."

References Cited in the file of this patent

UNITED STATES PATENTS

| | | |
|---|---|---|
| 2,528,790 | Scherer | Nov. 7, 1950 |
| 2,564,015 | Lillig | Aug. 14, 1951 |
| 2,593,642 | Wolverton | Apr. 22, 1952 |
| 2,608,624 | Goodrich | Aug. 26, 1952 |
| 2,646,215 | Stovall | July 21, 1953 |
| 2,704,310 | Johnson | Mar. 15, 1955 |
| 2,712,125 | Koch | June 28, 1955 |
| 2,769,165 | Bower | Oct. 30, 1956 |
| 2,848,158 | Miller | Aug. 19, 1958 |
| 2,881,975 | Bower | Apr. 14, 1959 |
| 2,889,544 | Grant et al. | June 2, 1959 |
| 2,908,895 | Cooper | Oct. 13, 1959 |